United States Patent Office 3,605,257
Patented Sept. 20, 1971

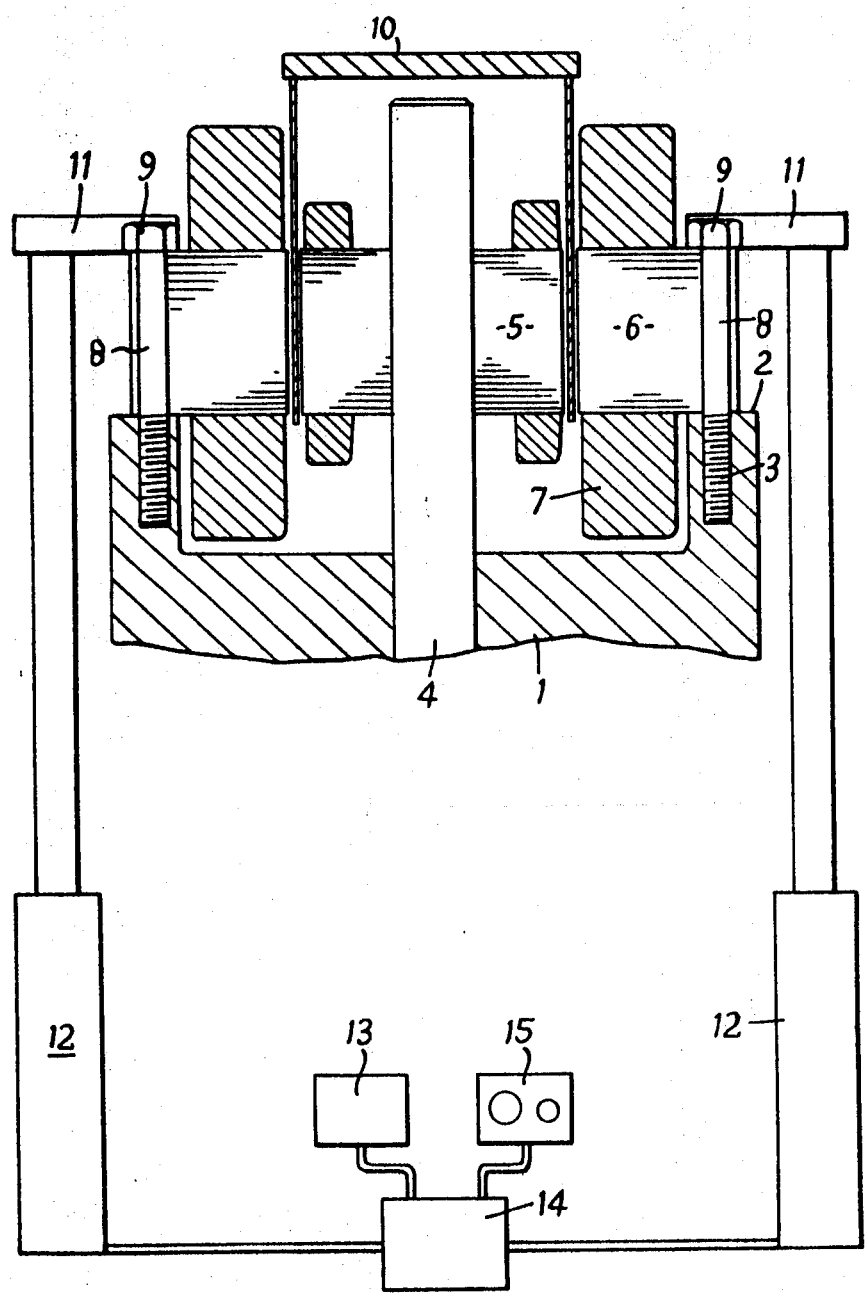

3,605,257
METHOD FOR MOUNTING LAMINATED STATORS
Gilbert Andrew McMahon, Motherwell, Scotland, assignor to Ranco Motors Limited, Glasgow, Scotland
Filed May 13, 1968, Ser. No. 728,428
Claims priority, application Great Britain, May 18, 1967, 23,258/67
Int. Cl. H02k 15/00
U.S. Cl. 29—596
10 Claims

ABSTRACT OF THE DISCLOSURE

A method of assembly of an electric motor comprising a mounting block, a rotor mounted to rotate relative to the mounting block and a stator secured to the mounting block; the method consisting in applying a purely axial compressive force to the stator as it is secured to the block.

---

The invention relates to a method of electric motor assembly.

According to the invention there is provided a method of assembly of an electric motor comprising a mounting block, a rotor mounted to rotate relative to the mounting block and a stator secured to the mounting block; the method consisting in applying a purely axial compressive force to the stator as it is secured to the block. In this context a purely axial compressive force is a force parallel or coincident with the stator axis and having no twisting component.

The invention also includes within its scope an electric motor assembled by the foregoing method.

Preferably the axial force is provided by a plurality of more fluid-operated clamps acting at places distributed around the stator. Preferably the clamps are pneumatically operated. Alternatively, however they may be hydraulically operated. The clamps may be each operated independently by respective pneumatic or hydraulic rams or they may be joined with each other and all operated by a common ram.

The invention is particularly, but not exclusively, applicable to assemblies in which the stator is secured to the block by means of bolts which pass through the stator. In such applications said places where the pressure is applied are preferably in the locality of the securing bolts. Although the expression "bolts" is used herein it is to be understood that the method may include the use of not only bolts which have heads and which pass through the stator to be threaded into receiving threads in the mounting block, but also studs set in the mounting block and which pass through the stator, the stator being secured thereto by means of nuts.

The method according to the invention may also be used with advantage in assemblies in which the stator is welded to the block. As an alternative feature of the invention it is proposed to bond the stator to the block and the method according to the invention is applicable to such assemblies.

In order to locate the stator correctly with respect to the rotor axis before it is secured to the block the rotor may be placed in position and surrounded by a cylindrical can or a number of feelers to determine the correct air-gap between rotor and stator; or in place of the rotor a mandrel, perhaps of the expanding kind, may be located in the stator bore and accurately aligned with the rotor axis. Furthermore, in order to locate the bolt holes where bolts are being used, the bolts are preferably started in their threads before the axial force is applied.

The invention is particularly applicable to stators which are laminated and in which the laminations are secured together by welding, cleating, or indented laminations and most particularly to unsecured laminations as used in the arrangement described in copending application No. 6,849/67.

It is found that the use of this invention substantially reduces the number of completed motor assemblies which it is necessary to reject because of mis-alignment. It is believed that the cases of mis-alignment which are experienced in practice are due to two primary causes. Firstly, mis-alignment is caused, when securing bolts are used, by the twisting torque to which the stator is subjected as the bolts or nuts are screwed home, these twisting torques being furthermore generally uneven because of different head speeds of the individual bolt runners.

Secondly, laminated stators are subject to mis-alignment of the laminations with respect to the stator bore during the processes of finishing and winding. It is felt that the improvements achieved by the present invention may be due to re-alignment of the stator laminations by the application of purely axial pressure in conjuncion with the aligning mandrel or the like, this improvement being equally effective for stators which are welded or bonded on to the block as well as for those which are bolted. In bolted stators this improvement exhibits itself in a lowering of the rejection rate is statistical tests involving the comparison of bolt torque necessary to screw home the bolts and bolt torque necessary to unscrew them. The improvement may be regarded as a consolidation and re-alignment of the stator laminations by the axial pressure. An improvement peculiar to bolted stators is the prevention, by the axial pressure, of twisting effects of the bolts on the stator.

The invention will further be described with reference to the accompanying drawing, the sole figure of which is a cross sectional elevation of a motor in the course of assembly by means of the method according to the present invention.

Referring to the figure there is shown a mounting block 1 which is part of a refrigerator and constitutes the mount for the compressor motor. Block 1 has a flat mounting face 2 around which there are evenly distributed four threaded holes 3. A central bore receives a rotor shaft 4 which is free to rotate in the block and which carries the motor rotor 5.

The stator 6 of the motor is laminated and carries stator windings 7. Four bolt holes passing from end to end of the stator receive securing bolts 8 which have integral heads 9 and which are received in the threaded holes 3 in block 1.

In assembling the motor the rotor 5 is mounted on shaft 4 in block 1 and an assembly can 10 is held over the rotor, being of sufficient diameter as to determine the necessary air-gap between rotor and stator. The stator 6 is aligned on the can 10 and the bolt holes in the stator are aligned with holes 3 by starting the bolts 8 in their threads, but without tightening them. With the stator so aligned there is applied thereto a purely axial compressive force derived from four clamps 11 which bear on the stator at places immediately surrounding the bolt holes while leaving sufficient room for access to the bolts by the bolt head runners (not shown). Typically, the force given by each of the four clamps is of the order 700 to 1000 lbs.

The pressure to each clamp 11 is derived from a respective air ram 12 which receives pressure from a common source 13 through a valve arrangement 14. The four air rams are controlled simultaneously by valve arrangement 14 in response to a switch on a control console 15.

When the axial pressure is applied, then a further switch on control console 15 is operated to activate the bolt runners and screw home the bolts to a predetermined torque value. The pressure from rams 12 is then released and the clamps 11 are removed. Can 10 is removed and the air-gap between rotor and stator is checked in the usual way by running a feeler of predetermined thickness around the gap.

The invention is not restricted to the details of the foregoing description made with reference to the accompanying drawings. For example, the arrangement of the clamps with pneumatic rams for applying the axial pressure may be substituted by any other suitable means for applying purely axial pressure.

I claim:

1. A method of assembly of an electric motor comprising a mounting block, a rotor mounted to rotate relative to the mounting block and a stator secured to the mounting block; the method consisting in mounting a stack of thin, flat, unbonded stator laminations on the mounting block, aligning the laminations, applying a purely axial compressive force to the stator laminations by activating a plurality of clamps acting at places distributed around the stator and securing said laminations to said mounting block and maintaining said unbonded laminations in their compressed condition by means of bolts which pass through said laminations and into said mounting block while said compressive force is being applied.

2. A method as claimed in claim 1 wherein said clamps are fluid-operated.

3. A method as claimed in claim 2 wherein the clamps are pneumatically operated.

4. A method as claimed in claim 1 wherein the stator is secured to the block by means of bolts which pass through the stator and said axial pressure is applied in the locality of the securing bolts.

5. A method as claimed in claim 4 wherein the bolts are started in their threads before the axial force is applied.

6. A method as claimed in claim 1 wherein, before the stator is secured to the block, the rotor of the motor is placed therein and the stator is aligned with respect to the rotor.

7. A method as claimed in claim 6 wherein the stator is aligned with the aid of a cylindrical can gauge inserted in the rotor-stator gap.

8. A method as claimed in claim 7 wherein the stator is secured to the block by means of bolts which pass through the stator, a bolt head runner is provided to screw the bolts home and said axial pressure is provided by pneumatically operated clamps, the method comprising, after inserting the rotor and the can gauge, activating the pneumatic clamps, activating the bolts head runner to screw home the bolts to a predetermined torque value, releasing the pneumatic clamps and removing the can gauge.

9. A method as claimed in claim 8 further comprising checking the rotor-stator gap by running a feeler gauge of predetermined thickness around the gap after removal of the can gauge.

10. A method as claimed in claim 1 wherein, before the stator is secured to the block an expandible mandrel aligned with the desired stator axis is placed therein and expanded to align the stator.

References Cited

UNITED STATES PATENTS

| | | | |
|---|---|---|---|
| 2,304,607 | 12/1942 | Sleeter | 29—596 |
| 3,176,380 | 4/1965 | Wightman | 29—596 |
| 3,299,304 | 1/1967 | Hull | 310—217 |
| 3,359,628 | 12/1967 | Rutledge et al. | 29—596 |
| 3,408,734 | 11/1968 | Leahy et al. | 29—596 |
| 3,465,188 | 9/1969 | Sisk | 310—217 |

JOHN F. CAMPBELL, Primary Examiner

C. E. HALL, Assistant Examiner

U.S. Cl. X.R.

29—609; 310—42, 217